United States Patent [19]
Taylor

[11] Patent Number: 5,903,115
[45] Date of Patent: May 11, 1999

[54] AUXILIARY SYSTEM INCLUDING A PLURALITY OF AC MOTORS POWERED DIRECTLY BY AN ELECTRIC GENERATOR

[75] Inventor: Colin Taylor, Lakewood, Calif.

[73] Assignee: AlliedSignal Inc., Morristown, N.J.

[21] Appl. No.: 08/977,302

[22] Filed: Nov. 24, 1997

[51] Int. Cl.⁶ .................................................. H02P 5/46
[52] U.S. Cl. ............................................................. 318/34
[58] Field of Search ................................. 318/34, 35, 66, 318/67, 77; 307/11, 12, 13, 38; 322/7, 8

Primary Examiner—William M. Shoop, Jr.
Assistant Examiner—Rina Duda
Attorney, Agent, or Firm—Robert Desmond, Esq.

[57] ABSTRACT

An auxiliary system includes a plurality of devices that are driven by ac motors. A plurality of independently controllable isolators couple phase windings of the ac motors directly to phase windings of the electric generator. When an isolator connects the phase windings of its corresponding ac motor to the windings of the electric generator, the ac motor is operated directly on a high frequency unconverted output of the electric generator. Motor speed is determined by the number of poles on the ac motor relative to the number of poles of the electric generator. Pole-switching allows the speed of the motor to be varied.

14 Claims, 3 Drawing Sheets

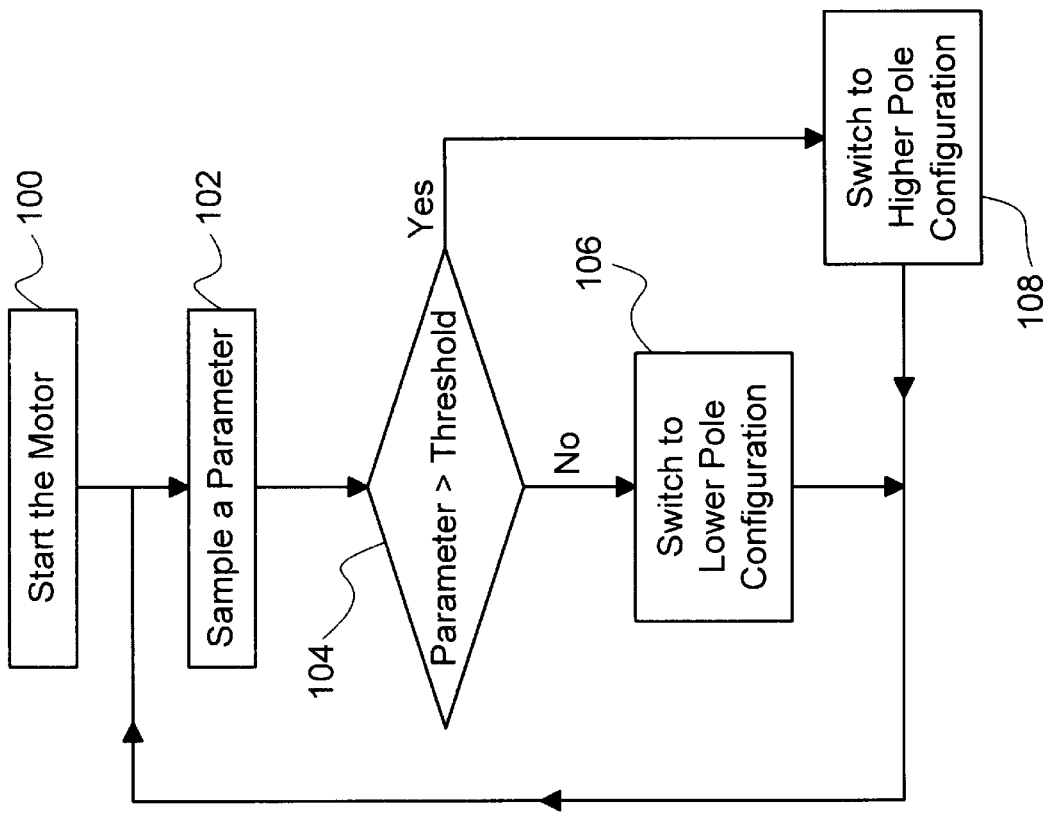

AUXILIARY SYSTEM INCLUDING A PLURALITY OF AC MOTORS POWERED DIRECTLY BY AN ELECTRIC GENERATOR

BACKGROUND OF THE INVENTION

The invention relates to electrical machines. More specifically, the invention relates to an auxiliary system including a plurality of ac motors that are powered by an electric generator.

Gas turbine engines provide propulsion for aircraft and certain ground-based vehicles. In addition to providing the propulsion, the gas turbine engines also drive hydraulic pumps, fuel pumps and other auxiliary devices on the aircraft and ground-based vehicles. Typically, gearboxes transmit shaft power of the gas turbines to the auxiliary devices.

Gearboxes are heavy and noisy. They also require lubrication and all of the maintenance demands of a lubrication system. Additionally, gearboxes can be unreliable.

These problems are compounded for gas turbine engines that drive multiple auxiliary devices. Additional gears are needed for driving the additional devices, thus adding additional weight, noise and unreliability. There are additional problems as well. If some of the auxiliary devices need to be switched in and out, mechanical clutches are added to the system. Moreover, adding auxiliary devices to an existing system would be difficult since the gearbox design would have to be modified.

Additional problems can arise because the auxiliary devices cannot be located remotely from the gearbox. When a pump is located at the gearbox and its hydraulic load is located remotely from the gearbox, a hydraulic line is extended from the pump to the hydraulic load. The hydraulic line has the potential for leakage, which presents a fire risk among other things.

SUMMARY OF THE INVENTION

The invention can be regarded as a gearboxless auxiliary system comprising an n-pole electric generator (where n is an even, positive integer); and a plurality of ac motors. Each motor has a selected number of poles and a pole ratio. The pole ratio of a given motor is equal to n divided by the number of poles of the given motor. The system further comprises a plurality of independently controllable isolators corresponding to the plurality of motors. Each isolator is controllable to connect phase windings of its corresponding motor directly to phase windings of the ac generator. Speed of a motor connected directly to the phase windings of the generator is approximately equal to a product of the its pole ratio and generator speed.

BRIEF DESCRIPTION OF THE DRAWINGS

FIG. 4 is a flowchart of a method of operating an ac motor using pole switching.

DETAILED DESCRIPTION OF THE INVENTION

Figure 1:
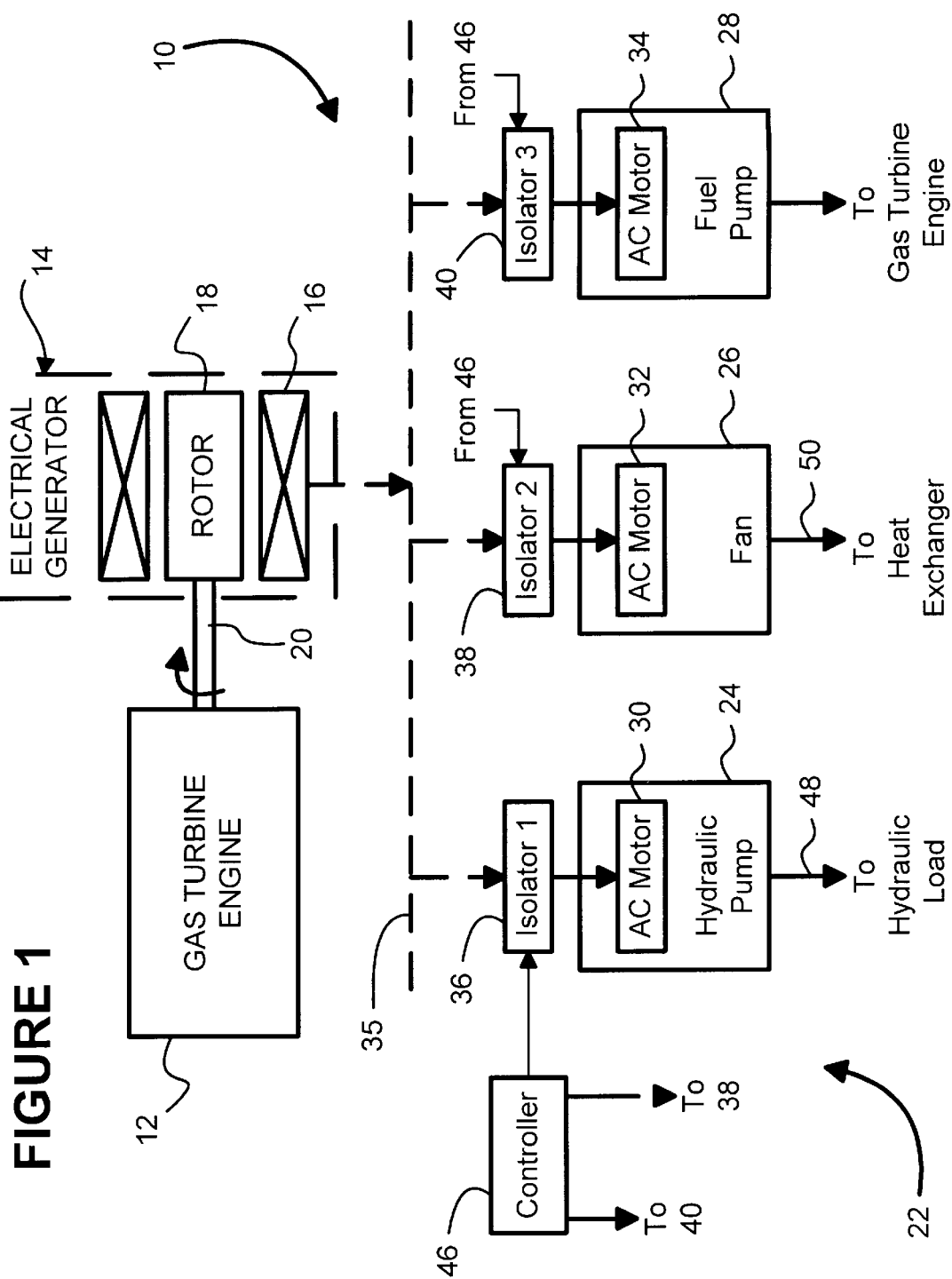
FIG. 1 is a block diagram of a gearboxless auxiliary system according to the present invention.

FIG. 1 shows a system 10 such as a vehicle propulsion system or auxiliary power unit including a gas turbine engine 12 and an electric generator 14 that is driven by shaft power of the gas turbine engine 12. The electric generator 14 has n-poles, where the number n is an even positive integer. Thus, the electric generator 14 has two, four or more poles. The electric generator 14 can be a permanent magnet machine, the number of poles of which is determined by the number of magnetic poles in its rotor 18. The electric generator 14 can have any number of phase windings 16, although three-phase windings 16 is typical. The electric generator 14 can be integrated with the turbine engine 12 (e.g., the rotor is directly mounted to a shaft between a compressor and a power turbine) or it can be coupled to an output shaft 20 of the gas turbine engine 12. When driven by the gas turbine engine 12, the electric generator 14 provides an ac output having a frequency that is proportional to the shaft speed of the turbine engine 12.

The system 10 also includes an auxiliary system 22 including devices such as hydraulic pumps 24, fuel pumps 28 and fans 26. The devices 24, 26 and 28 are driven by ac motors 30, 32 and 34 such as induction motors and synchronous motors. For example, fan blades of a fan 26 are rotated by an ac motor 32.

Figure 2:
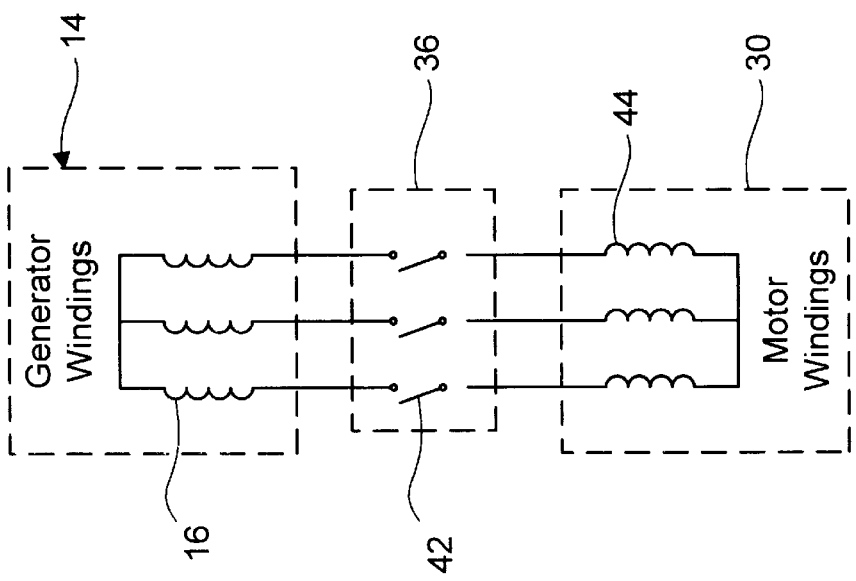
FIG. 2 is a schematic diagram of ac motor windings that are coupled to generator windings by an isolator.

The ac motors 30, 32 and 34 are powered by the electric generator 14. Electrical power is made available on a power bus 35. A plurality of isolators 36, 38 and 40 couple the ac motors 30, 32 and 34 directly to the electric generator 14. There is an isolator 36, 38 or 40 corresponding to each ac motor 30, 32 or 34. Each isolator 36, 38 and 40 includes a plurality of switches 42, each switch 42 coupling a phase winding 44 of its corresponding ac motor 30, 32 or 34 to a phase winding 16 of the electric generator 14 (see FIG. 2, which shows an isolator 36 having three switches 42 for the three-phase motor 30 of the hydraulic pump 24). Thus, the ac motors 30, 32 and 34 are operated directly on the high frequency unconverted output of the electric generator 14.

Each ac motor 30, 32 and 34 has a pole ratio. The pole ratio of a given ac motor 30, 32 or 34 is equal to n (the number of poles of the electric generator 14) divided by the number of poles of the given ac motor 30, 32 or 34. Speed of the given ac motor 30, 32 or 34 is approximately equal to a product of the generator speed and the pole ratio of the given ac motor 30, 32 or 34. For example, the ac motor 30 for the hydraulic pump 24 can be an 18-pole, three phase induction motor that is powered by the unconditioned ac output from a two-pole main shaft generator 14. Resulting is a pole ratio of 1:9, which results in an approximate 9:1 speed reduction for driving the hydraulic pump 22 at its optimum speed. Thus, such a two-pole electric generator 14 having a shaft speed of approximately 76,500 rpm will drive such an 18-pole ac motor 30 at approximately 8500 rpm.

The isolators 36, 38 and 40 are independently controllable. An auxiliary device 24, 26 or 28 is operated simply by closing the switches 42 of its corresponding isolator 36, 38 or 40. Thus, one or more devices can be operated while electrical power is being generated by the electric generator 14. The isolators 36, 38 and 40 are all controlled by a controller 46, the operation of which will be described below in connection with FIG. 4.

If an ac motor 30, 32 or 34 can be pole-switched, its speed can be varied. For example, switching the poles of an ac motor 30, 32 or 34 from four to two would double the motor speed. The number of different motor speeds depends upon the number of poles that can be switched. Pole switching will be described below in connection with FIG. 3.

Poles of the electric generator 14 could also be switched. For example, an electric generator 14 having two different pole configurations and an ac motor having two different pole configurations could produce four different motor speeds. The number of additional motor speeds depends upon the number of electric generator poles.

Each ac motor 30, 32 and 34 can be located remotely from the electric generator 14. Thus, the hydraulic pump 24 can be placed near its hydraulic load, thereby reducing the length of hydraulic line 48 between the hydraulic pump 24 and the hydraulic load. The fan 26 could be located near the object to be cooled (e.g., a heat exchanger), thereby reducing the length of ductwork 50. In contrast, a gear-driven hydraulic pump and a gear-driven fan would be located proximate the turbine engine 12. A hydraulic line would have to be extended to the gear-driven hydraulic pump, and ductwork would have to be extended to the gear-driven fan.

Other devices can be easily added to and removed from the auxiliary system 22 without having to modify the gas turbine engine 12 or the electric generator 14. All that is needed to add another device to the auxiliary system 22 is an isolator. The ac motor of the added device would have a pole ratio that produces an optimal speed for the added device. Thus, a large number of ac motor-driven devices can be added to the auxiliary system 22, provided that the gas turbine engine 12 and the electric generator 14 have the power capacity.

Other non-motor driven devices can be added to the auxiliary system 22 as well. For example, a dc rectifier can be added to the auxiliary system 22. A dc output of the rectifier could be supplied to dc equipment in the auxiliary system.

Figure 3:
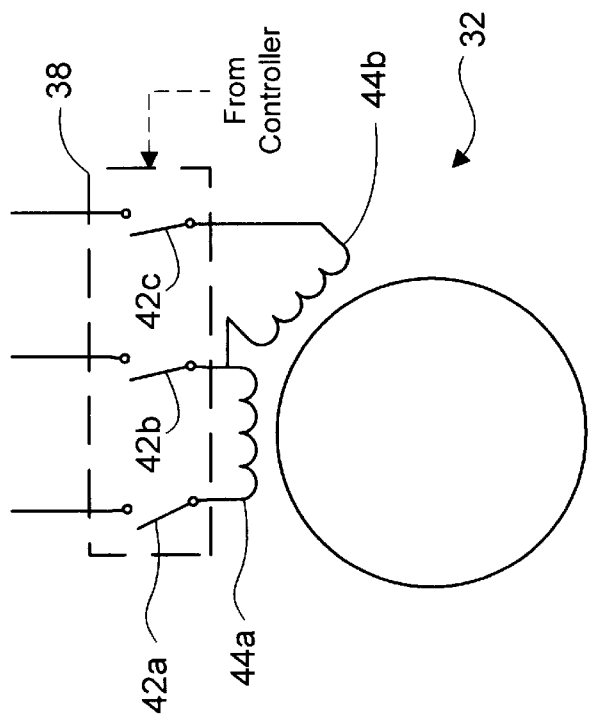
FIG. 3 is a schematic diagram of ac motor windings that can be pole-switched.

FIG. 3 shows that the ac motor 32 for the fan 26 can be pole-switched. The ac motor 32 includes a plurality of phase windings that are switched in different combinations to produce different pole configurations. Switching is performed by the isolator 38. To facilitate an understanding of pole switching, FIG. 3 shows only first and second phase windings 44a and 44b of the plurality of windings and only first, second and third switches 42a, 42b and 42c of the isolator 38. The first and second phase windings 44a and 44b are coupled in series. For example, closing the first, second switches 42a, 42b and 42c would produce two poles, whereas closing only the first and third switches 42a and 42c would produce only a single pole.

FIG. 4 shows a method in which the controller 46 controls the operation of the fan 26. The controller 46 turns on the fan 26 by commanding the isolator 38 to close (step 100). Then the controller 46 samples a parameter (step 102) and compares the sampled parameter to a threshold (step 104). If the sampled parameter is below the threshold, the controller 46 commands the isolator 38 to switch the ac motor 32 to a lower pole configuration (step 106). If the parameter is above the threshold, the controller 46 commands the isolator 38 to switch to a higher pole configuration (step 108). Thus, if the sampled parameter is temperature and the ac motor 32 can be switched between a two-pole configuration and a four-pole configuration, the controller 46 will control the ac motor 32 to run slower (i.e., at the two-pole configuration) when the temperature is below the threshold, and it will control the ac motor 32 to run faster (i.e., at the four pole configuration) when the temperature is above the threshold. Comparisons might be made to additional thresholds if additional pole configurations are available.

Similarly, the ac motor 34 for the fuel pump 28 could be operated at four poles if boost is needed and two poles during normal operation. Additionally, the fuel pump 28 tracks the speed of the gas turbine engine 12. If the gas turbine engine 12 runs slowly, the fuel pump 28 runs slowly.

The controller 46 controls the isolator corresponding to a given device according to the specific design and operating characteristics of the given device. For the hydraulic pump 24 having three-phase windings that cannot be pole-switched, the controller 46 merely opens and closes the switches 42 of the isolator 36 when the hydraulic pump is to be stopped and started.

Thus disclosed is an auxiliary system including a plurality of ac motor-driven devices that are driven without a gearbox coupled to a turbine engine. Selection of the number of poles on the ac motors and the generator provides the equivalent of a gearbox. The electrical isolators provide the electrical equivalent of clutches. Starting characteristics of the ac motors are the electrical equivalents of clutch engagement characteristics.

Additional devices can be added and removed from the auxiliary system without having to modify the design of the gas turbine engine or the electric generator. Electrical transmission at multiple speeds is obtained without the need for any frequency or voltage conversion electronics.

Eliminating a gearbox for driving the ac motor-driven devices reduces weight and noise. It also increases reliability and eliminates the need for an oil based lubrication system.

The ac motors do not have to be located proximate the gas turbine engine. Thus the auxiliary system provides degrees of freedom not allowed by gearbox-based systems.

The auxiliary system can be used for any number of applications. For example, the auxiliary system can be used in an aircraft, a ground-based vehicle or an auxiliary power unit. The auxiliary system could also be used in an industrial electric generator.

Modifications can be made without departing from the spirit and scope of the invention. For example, the electric generator could be a ring wound or induction generator instead of a permanent magnet generator. The auxiliary system could include one or more pumps, one or more fans, one or more different devices, any combination thereof. These considerations, the selection of poles on the generator and the ac motor, the ability to pole-switch and other considerations including the types and operating characteristics of the motor-driven devices, are all dependent upon the application for which the auxiliary system is intended.

I claim:

1. A gearboxless auxiliary system comprising:
    an n-pole electric generator, where n is a positive even integer;
    a plurality of ac motors, each motor having a selected number of poles and a pole ratio, the pole ratio of a given motor being equal to n divided by the number of poles of the given motor; and
    a plurality of independently controllable isolators corresponding to the plurality of motors, each isolator being controllable to connect phase windings of its corresponding motor directly to phase windings of the generator, wherein speed of a motor connected directly to the phase windings of the generator is approximately equal to a product of the generator speed and the pole ratio of the motor connected directly to the generator phase windings.

2. The system of claim 1, wherein at least one of the ac motors has phase windings that are switchable in different combinations to produce different pole configurations, and wherein the corresponding isolator of each motor having switchable phase windings is controllable to connect different combinations of the switchable phase windings to the phase windings of generator, whereby switching the poles of a motor causes speed of the motor to change.

3. The system of claim 1, further comprising a controller for independently controlling the isolators.

4. The system of claim 1, wherein at least two of the ac motors have different numbers of poles, whereby at least two of the ac motors are operated at different speeds.

5. A system comprising:

an engine;

an n-pole electric generator driven by the engine, where n is a positive even integer, the generator including a plurality of phase windings;

a plurality of auxiliary devices driven by the generator, each device of the plurality including an ac motor, each ac motor having a selected number of poles and a pole ratio, the pole ratio of a given ac motor being equal to n divided by the number of poles of the given motor; and a plurality of independently controllable isolators corresponding to the plurality of ac motors, each isolator being controllable to connect phase windings of its corresponding ac motor directly to the phase windings of the generator, wherein speed of a given ac motor connected directly to the phase windings of the generator is approximately equal to a product of the generator speed and the pole ratio of the given ac motor.

6. The system of claim 5, wherein at least one of the plurality of auxiliary devices includes a hydraulic pump located remotely from the engine.

7. The system of claim 5, wherein at least one of the plurality of auxiliary devices includes a fuel pump for the engine, the fuel pump being located remotely from the engine.

8. The system of claim 5, wherein at least one of the plurality of auxiliary devices includes a fan located remotely from the engine.

9. The system of claim 5, wherein at least one of the ac motors has phase windings that are switchable in different combinations to produce different pole configurations, and wherein the corresponding isolator of each motor having switchable phase windings is controllable to connect different combinations of the switchable phase windings to the phase windings of generator, whereby switching the poles of a motor causes speed of the motor to change.

10. The system of claim 5, wherein the phase windings of the electric generator are switchable in different combinations to produce different pole configurations, whereby switching pole configurations of the electrical generator causes a speed change in each motor connected directly to the windings of the electrical generator.

11. The system of claim 5, further comprising a controller for independently controlling each of the isolators.

12. The system of claim 5, wherein at least two of the ac motors have different numbers of poles, whereby at least two of the ac motors are operated at different speeds.

13. A method of operating a plurality of ac motors using an electric generator, the electric generator including phase windings, the method comprising the steps of:

operating the electric generator to induce ac current in the phase windings of the electrical generator;

operating selected ac motors by connecting phase windings of the selected motors directly to the phase windings of the electric generator; and switching poles on at least one of the motors being operated, whereby the motor speed of at least one of the motors is changed.

14. The method of claim 13, wherein the step of switching poles includes measuring a parameter corresponding to the motor, comparing the parameter to a threshold, and switching the poles if the parameter changes sides of the threshold.

* * * * *